United States Patent [19]

Yorke

[11] 4,357,207

[45] Nov. 2, 1982

[54] LOW MOLECULAR WEIGHT CATIONIC POLYMERS AS DEPOSIT INHIBITORS AND DISPERSANTS IN BLACK LIQUOR RECOVERY SYSTEMS

[75] Inventor: Monica A. Yorke, Coraopolis, Pa.

[73] Assignee: Calgon Corporation, Pittsburgh, Pa.

[21] Appl. No.: 269,131

[22] Filed: Jun. 1, 1981

[51] Int. Cl.$^3$ ............................................. B01D 1/00
[52] U.S. Cl. ..................... 159/47 WL; 159/DIG. 13; 210/698; 210/701; 252/180
[58] Field of Search ................ 159/47 WL, DIG. 13; 252/175, 180, 82; 203/7; 210/58, 698, 670, 701

[56] References Cited

U.S. PATENT DOCUMENTS

| | | | |
|---|---|---|---|
| 2,343,085 | 2/1944 | Savell | 159/DIG. 13 |
| 3,061,478 | 10/1962 | Kent | 159/DIG. 13 |
| 3,251,778 | 5/1966 | Dickson et al. | 252/180 |
| 3,289,734 | 12/1966 | Robertson | 159/47 |
| 3,516,910 | 6/1970 | Eagman et al. | 203/7 |
| 3,829,388 | 8/1974 | Lange et al. | 252/180 |
| 3,951,793 | 4/1976 | Tate et al. | 252/180 |
| 4,062,796 | 12/1977 | Gardner | 252/180 |
| 4,072,607 | 2/1978 | Schiller et al. | 210/58 |
| 4,164,574 | 8/1979 | Quinlan | 252/180 |
| 4,255,309 | 3/1981 | Klaessig et al. | 260/29.6 |

*Primary Examiner*—Norman Yudkoff
*Attorney, Agent, or Firm*—Martin L. Katz; R. Brent Olson

[57] ABSTRACT

The instant invention is directed to a method of inhibiting and dispersing deposit formation on metal surfaces of an evaporator used for the processing of black liquor which comprises the step of treating black liquor, at any point prior to completion of said processing, with a deposit inhibiting concentration of low molecular weight cationic polymer selected from the group consisting of poly(diallyldimethylammonium chloride), polymethacrylamidopropyltrimethylammonium chloride, poly-2-methacryloxyethyltrimethylammonium methosulfate, and poly-2-methacryloxyethyltrimethylammonium chloride.

4 Claims, No Drawings

LOW MOLECULAR WEIGHT CATIONIC POLYMERS AS DEPOSIT INHIBITORS AND DISPERSANTS IN BLACK LIQUOR RECOVERY SYSTEMS

BACKGROUND OF THE INVENTION

In the production of kraft paper by the sulfate process, bark and chipped wood are treated with an alkaline aqueous liquid to remove certain organic contaminants from the wood, of which lignin is the chief component. Typically, commercially, the chips are cooked in a 10 percent solution of sodium hydroxide which contains about 20 mole percent of sodium sulfide. This reaction is usually conducted at temperatures of approximately 170° to 180° C. for a period of time ranging between 1 and 3 hours.

The resultant organic residues are removed from the chips by washing, which wash water contains dissolved lignin, emulsified soaps, other organic ingredients, and substantial amounts of inorganic salts and bases. This wash water is referred to as black liquor.

It is common practice in large mills to recover the inorganic components of the liquor and to use the organic portion as fuel. As produced, the black liquor will usually contain about 12 percent by weight of solid material. Before the liquor can be used as fuel and the inorganic components recovered, it is necessary that the material be concentrated, usually to a solids content of about 45 percent by weight or higher. The concentrating of the black liquor is usually conducted in multiple-effect evaporators. These evaporators are ordinarily operated by employing the steam produced in the highest pressure evaporator to heat the next highest pressure evaporator. The flow of liquor is counter-current to the flow of pressure and steam. In evaporators containing black liquor of the lowest solids concentration, the steam used usually produces a vacuum in the system.

The black liquor itself will show variations in composition from mill to mill. However, in most instances, inorganic carbonates, sulfides, sulfites, sulfates and silica are present, as well as organic sulfur compounds.

A common problem which rises with use of a black liquor multiple-effect evaporator is formation of substantial amounts of deposits which tend to stick to the interior walls or tubes of the evaporator units and remain in a tightly adherent state. A build-up of deposit formation results in a situation of measurably decreased overall efficiency of evaporation. For example, the deposit formation tends to materially decrease heat transfer, requiring an increased heat input to accomplish desired evaporation. Likewise, the problem of deposition leads to more frequent boil-outs with hot water or acids and a substantial increase in down-time. Deposit formation can occur in any of the effects of the multiple effect evaporator. There are usually 5 to 6 effects in each evaporator set, each effect containing a plurality of long-tube vertical units.

Various attempts have been made to use chemical agents to mitigate the problem of deposit formation (U.S. Pat. Nos. 4,072,607; 3,516,910 and 3,289,734), but by and large, their use has not been particularly successful. Prior art materials, such as those normally utilized to alleviate the problem of deposit formation in boilers, have shown little or no effect in overcoming the specific problem of deposit formation in black liquor evaporators.

There are two major classes of deposits which occur in black liquor evaporators. The first class consists of calcium scales of sulfate, oxalate and carbonate. The second class and the one which is most pertinent to this invention is sodium scales of sulfate, sulfite, carbonate, lignin salts and silicate.

It therefore becomes an object of the invention to provide a method of increasing the overall operational efficiency of a black liquor evaporator unit.

A more specific object of the invention is to provide a method of minimizing deposit formation in multiple-effect evaporators employed to concentrate black liquor in a papermaking process.

DESCRIPTION OF THE INVENTION

The instant invention is directed to a method of inhibiting and dispersing deposit formation on metal surfaces of an evaporator used for the processing of black liquor which comprises the step of treating the black liquor, at any point prior to completion of said processing, with a deposit inhibiting concentration of a low molecular weight cationic polymer.

The cationic polymer preferably used in the instant invention has a molecular weight of 2,000 to 50,000. The polymer is preferably added at about 50 to 500 ppm concentration to 30 to 50 percent black liquor solids, which is further concentrated, preferably to about 60 to 70 percent solids for incineration.

Any low molecular weight cationic polymer may be used. Examples include: poly(diallyldimethylammonium chloride), polyethyleneimine, polymethacrylamidopropyltrimethylammonium chloride, poly 2-methacryloxyethyltrimethylammonium methosulfate, and poly-2-methacryloxyethyltrimethylammonium chloride. The preferred cationic polymer is poly(diallyldimethylammonium chloride).

EXAMPLES

EXAMPLES 1 AND 2

The black liquor described in Table I, containing approximately 15 to 19 percent solids, obtained from a paper mill, was used in each of the examples.

TABLE I

| Characterization of Black Liquor | |
|---|---|
| Contents | Amount (ppm) |
| pH - 11.8 | |
| Total Solids | 250,000 |
| Dissolved Solids | 224,000 |
| Suspended Solids | 2,300 |
| Total Organic Carbon | 60,000 |
| Total Ca | 110 |
| Dissolved Ca | 100 |
| Dissolved Hardness ($CaCO_3$) | 430 |
| Total Mg | 44 |
| Total Na | 47,000 |
| Total $SO_4$ | 8,000 |
| Total Ba | 10 |
| Total Fe | 14 |

The black liquor was evaporated or concentrated to 30 percent and oxidized by bubbling air through it. Polymer was added as indicated in Table II to each sample of black liquor in Examples 1 and 2. The black liquor was then evaporated until a solids concentration of 65 to 70 percent was reached. The deposit in each Example was then removed from the evaporator apparatus, dried and weighed. Examples 1 and 2 are summarized in Table II.

TABLE II

| Example | Inhibitor | Molecular Weight | Dosage (ppm) | | | |
|---|---|---|---|---|---|---|
| | | | 0 | 150 | 250 | 500 |
| 1 | Poly(diallyl-dimethylammonium chloride) | about 8,000 | 7.06 | 4.80 | 1.96 | 2.99 |
| 2 | Poly(diallyl-dimethylammonium chloride) | about 14,000 | 7.06 | — | 1.69 | 1.22 |

What is claimed is:

1. A method of inhibiting and dispersing deposit formation on metal surfaces of an evaporator used for the processing of black liquor which comprises the step of treating the black liquor, at any point prior to completion of said processing, with a deposit inhibiting concentration of a low molecular weight poly(diallyldimethylammonium chloride).

2. A method of inhibiting and dispersing deposit formation on metal surfaces of an evaporator used for the processing of black liquor which comprises the step of treating the black liquor, at any point prior to completion of said processing, with a deposit inhibiting concentration of a low molecular weight cationic polymer selected from the group consisting of poly(diallyldimethylammonium chloride), polymethacrylamidopropyltrimethylammonium chloride, poly-2-methacryloxyethyltrimethylammonium methosulfate, and poly-2-methacryloxyethyltrimethylammonium chloride.

3. The process of claim 2, wherein said low molecular weight cationic polymer has a molecular weight of about 2,000 to 50,000.

4. The process of claim 2, wherein said low molecular weight cationic polymer is added at 50 to 500 ppm concentration to 30 to 50 percent black liquor solids.

* * * * *